(12) United States Patent
Kim et al.

(10) Patent No.: US 10,193,130 B2
(45) Date of Patent: Jan. 29, 2019

(54) RECHARGEABLE BATTERY PACK

(71) Applicant: Samsung SDI Co., Ltd., Yongin-si, Gyeonggi-do (KR)

(72) Inventors: Jae-Seung Kim, Yongin-si (KR); Kyung-Suk Ko, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 123 days.

(21) Appl. No.: 15/285,388

(22) Filed: Oct. 4, 2016

(65) Prior Publication Data

US 2017/0098815 A1   Apr. 6, 2017

(30) Foreign Application Priority Data

Oct. 6, 2015   (KR) .................. 10-2015-0140371

(51) Int. Cl.
*H01M 2/26* (2006.01)
*H01M 2/30* (2006.01)
*H01M 2/34* (2006.01)

(52) U.S. Cl.
CPC ............. *H01M 2/348* (2013.01); *H01M 2/26* (2013.01); *H01M 2/30* (2013.01); *H01M 2200/106* (2013.01)

(58) Field of Classification Search
CPC .......... H01M 2/348; H01M 2/30; H01M 2/26; H01M 2200/106
See application file for complete search history.

(56) References Cited

U.S. PATENT DOCUMENTS

| 2008/0118825 A1* | 5/2008 | Yoon ................... H01M 2/0404 429/122 |
| 2009/0136837 A1* | 5/2009 | Komoto ............ B29C 45/14065 429/149 |
| 2010/0266877 A1* | 10/2010 | Ebihara ............... H01M 2/0215 429/7 |
| 2013/0323536 A1 | 12/2013 | Hur et al. |

FOREIGN PATENT DOCUMENTS

| KR | 10-2006-0012810 A | 2/2006 |
| KR | 10-2013-0135063 A | 12/2013 |
| KR | 10-2014-0100038 A | 8/2014 |
| KR | 10-1469466 B1 | 12/2014 |

* cited by examiner

*Primary Examiner* — Osei K Amponsah
(74) *Attorney, Agent, or Firm* — Knobbe Martens Olson & Bear LLP

(57) ABSTRACT

A rechargeable battery pack is disclosed. In one aspect, the battery pack includes a battery cell including an electrode terminal in a cap plate and configured to perform charging and discharging operations, a protection element connected to the electrode terminal via a first connecting tab and a protection management package connected to a second connecting tab of the protection element and connected to the cap plate via an electrode tab. The battery pack also includes a molding portion enclosing the protection element and the protection management package; and an adhesive member disposed between the molding portion and the battery cell to attach them, wherein the first connecting tab has a bending portion bent between the electrode terminal and the protection element so as to set a height difference.

22 Claims, 5 Drawing Sheets

RECHARGEABLE BATTERY PACK

CROSS-REFERENCE TO RELATED APPLICATION

This application claims priority to and the benefit of Korean Patent Application No. 10-2015-0140371 filed in the Korean Intellectual Property Office on Oct. 6, 2015, the entire contents of which are incorporated herein by reference.

BACKGROUND

Field

The described technology generally relates to a rechargeable battery pack.

Description of the Related Technology

Unlike a primary battery, a rechargeable (or secondary) battery can be charged and discharged multiple times. Low-capacity rechargeable batteries are used in small portable electronic devices such as mobile phones, notebook computers, and camcorders, while a high-capacity rechargeable battery can be widely used as a power source for driving a motor of an electric bike, a scooter, an electric vehicle, a fork lift, etc.

Depending on device types, the rechargeable battery can be implemented as a battery cell or as a pack combining multiple battery cells. For example, a rechargeable battery pack includes a battery cell, a protection circuit module (PCM) connected to an electrode terminal to protect the battery cells or a protection management package (PMP), and a protection element.

The protection management package can prevent or minimize overcharge, over-discharge, an overcurrent, and a short circuit of the battery cell. In addition, the protection element is provided between the protection management package and the electrode terminal, and can be a resistive element having a positive temperature coefficient (PTC).

The PTC element, resistance of which increases, electrically cuts off the electrode terminal and the protection management package when the temperature of the battery cell reaches a predetermined risk value. It also electrically couples the electrode terminal and the protective circuit module when the temperature of the battery cell reaches a predetermined safety value.

In the rechargeable battery pack, a double-sided adhesive tape is used to attach a holder to the battery cell, combines a protection management package (PMP) to the holder, and connects a connecting tab of the PTC element connected to the PMP to the electrode terminal. However, in the rechargeable battery pack, since the holder is used, an assembly process is complicated as the number of parts increases, and connection between the electrode terminal and the connecting tab can be faulty when the holder and the battery cell are not properly attached.

The above information disclosed in this Background section is only to enhance the understanding of the background of the invention, and therefore it may contain information that does not form the prior art that is already known in this country to a person of ordinary skill in the art.

SUMMARY OF CERTAIN INVENTIVE ASPECTS

One inventive aspect relates to a rechargeable battery for connecting a protection management package to a battery cell via a connecting tab of a protection element.

Another aspect is a rechargeable battery pack that can reduce the number of parts and simplifying an assembly process.

Another aspect is a rechargeable battery pack in which connecting tabs connected to electrode terminals can absorb impacts.

Another aspect is a rechargeable battery that includes: a battery cell performing charging and discharging operations and including an electrode terminal in a cap plate; a protection element connected to the electrode terminal via a first connecting tab; a protection management package connected to a second connecting tab of the protection element and connected to the cap plate via an electrode tab; a molding portion burying the protection element and the protection management package; and an adhesive member disposed between the molding portion and the battery cell to attach them, wherein the first connecting tab has a bending portion that is bent between the electrode terminal and the protection element to set a height difference.

The first connecting tab may include a first welded part that is welded to the electrode terminal to be connected to the bending portion, and a second welded part that is connected to the bending portion and is welded to the protection element while having the height difference from the first welded part.

The second welded part may be extended from the bending portion in a first direction.

The first welded part may include a through-hole toward the electrode terminal.

The second welded part and the second connecting tab may include recess grooves that are separated from each other in a second direction crossing the first direction to be connected to the protection element and face each other to open a top side of the electrode terminal.

The molding portion may include: a first mold member burying the protection element at one side; and a second mold member that is separated from the first mold member while interposing the electrode terminal therebetween to bury the protection management package.

The second mold member may further bury the second welded part of the recess groove and the second connecting tab that face each other.

The rechargeable battery according to the current exemplary embodiment of the present invention pack further includes a dummy tab protruding toward the first mold member to be connected to the cap plate. The electrode tab may be connected to the protection management package and protrude toward the second mold member.

The electrode tab and the dummy tab may have different shapes at parts where they are welded to the cap plate.

The electrode tab and the dummy tab may be disposed to be closer to one side of the cap plate from a center thereof.

Another aspect is a rechargeable battery pack including: a battery cell including an electrode terminal in a cap plate and configured to perform charging and discharging operations; a protection element connected to the electrode terminal via a first connecting tab; a protection management package connected to a second connecting tab of the protection element and connected to the cap plate via an electrode tab; a molding portion enclosing the protection element and the protection management package; and an adhesive member disposed between the molding portion and the battery cell to attach them, wherein the first connecting tab has a bending portion with a bend between the electrode terminal and the protection element so as to set a height difference.

In the above battery pack, the first connecting tab includes a first welded portion welded to the electrode terminal to be connected to the bending portion, and a second welded portion connected to the bending portion and welded to the protection element while having the height difference with respect to the first welded portion. In the above battery pack, the second welded portion extends from the bending portion in a first direction. In the above battery pack, the first welded portion includes a through-hole toward the electrode terminal. In the above battery pack, the through-hole does not overlap the protection element.

In the above battery pack, the second welded portion and the second connecting tab include recess grooves that are separated from each other in a second direction crossing the first direction to be connected to the protection element and face each other to open a top side of the electrode terminal. In the above battery pack, the molding portion includes: a first mold member covering the protection element at one side; and a second mold member separated from the first mold member while interposing the electrode terminal therebetween to enclose the protection management package.

In the above battery pack, the second mold member further encloses the second welded portion of the recess groove and the second connecting tab that face each other. The above battery pack further comprises a dummy tab protruding toward the first mold member to be connected to the cap plate, wherein the electrode tab is connected to the protection management package and protrudes toward the second mold member.

In the above battery pack, the electrode tab and the dummy tab have different shapes at parts where they are welded to the cap plate. In the above battery pack, the electrode tab and the dummy tab are disposed to be closer to one side of the cap plate from a center thereof. In the above battery pack, a top surface of the protection element is farther from the battery cell than the protection management package. In the above battery pack, the protection management package is wider than the protection element. In the above battery pack, the molding portion fully encloses the protection element and the protection management package such that the protection element and the protection management package are invisible. In the above battery pack, the adhesive member overlaps at least one of the protection element and the protection management package in the height dimension of the rechargeable battery pack.

Another aspect is rechargeable battery pack including: a battery cell including an electrode terminal; a protection management package configured to prevent at least one of overcharge, over-discharge, an overcurrent, and a short circuit of the battery cell; a protection element including first and second connecting tabs and configured to electrically cut off the electrode terminal and the protection management package when a temperature of the battery cell reaches a threshold value; a molding portion enclosing the protection element and the protection management package; and an adhesive member disposed between the molding portion and the battery cell to attach them, wherein the first connecting tab has a bending portion bent between the electrode terminal and the protection element so as to set a height difference.

In the above battery pack, a top surface of the protection element is farther from the battery cell than the protection management package. In the above battery pack, the protection management package is wider than the protection element. In the above battery pack, the molding portion fully encloses the protection element and the protection management package such that the protection element and the protection management package are not visible. In the above battery pack, the adhesive member overlaps at least one of the protection element and the protection management package in the height dimension of the rechargeable battery pack.

According to at least one of the disclosed embodiments, since the protection element and the protection management package are buried by the molding portion, and the molding portion is attached to the battery cell via the adhesive member, the number of parts can be reduced and the assembly process can be simplified when manufacturing the rechargeable battery pack.

In addition, since the bending portion having a height difference is provided in the first connecting tab connecting the protection element to the electrode terminal, the impacts applied to the rechargeable battery pack can be absorbed.

DETAILED DESCRIPTION OF CERTAIN INVENTIVE EMBODIMENTS

Figure 1:
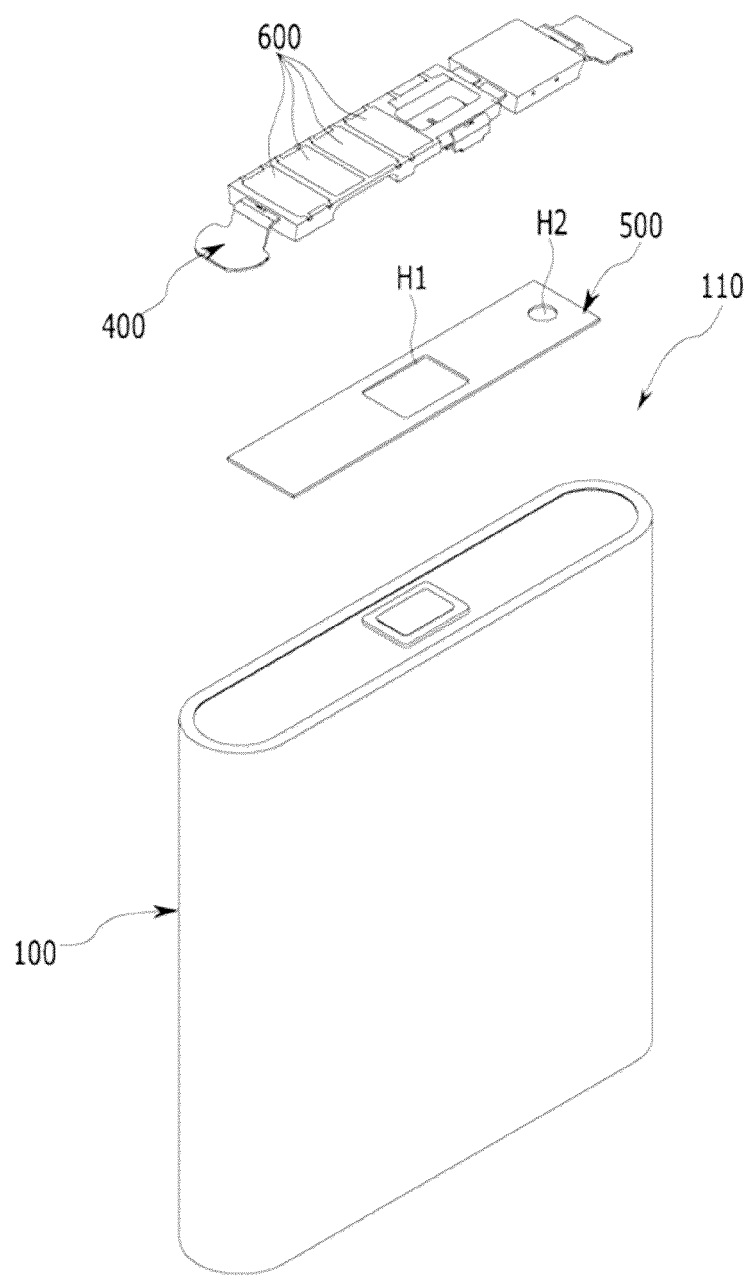
FIG. 1 is an exploded perspective view of a rechargeable battery pack according to an exemplary embodiment.

Embodiments will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

FIG. 1 is an exploded perspective view of a rechargeable battery pack 110 according to an exemplary embodiment.

Figure 2:
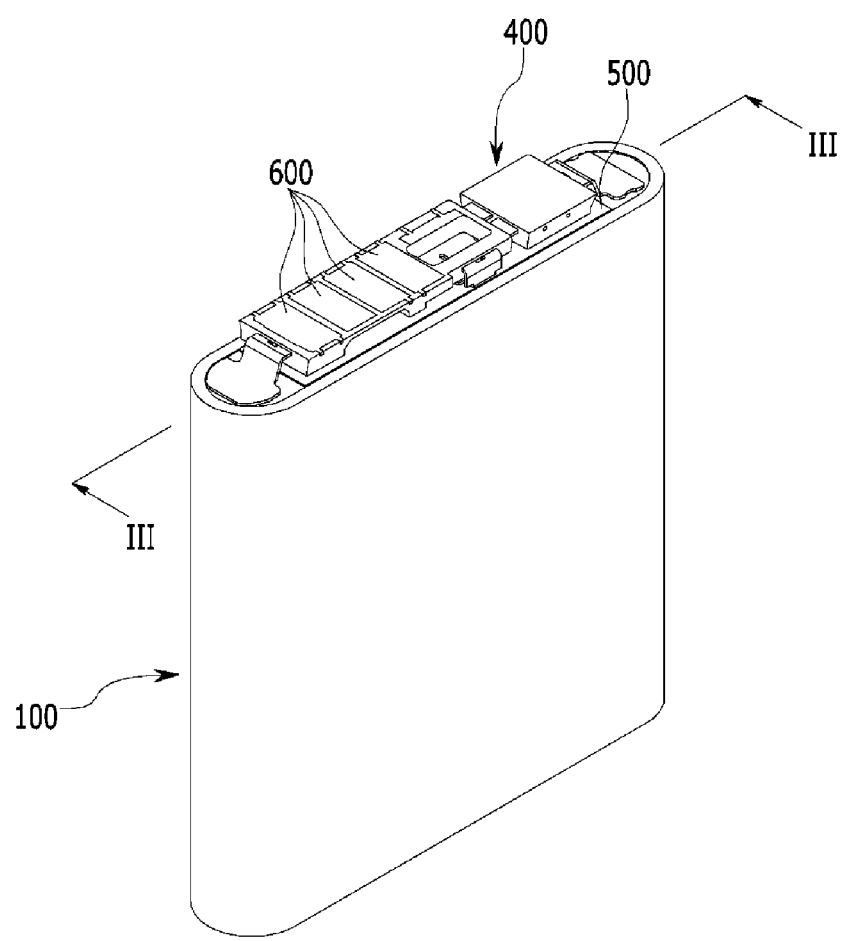
FIG. 2 is a perspective view of the rechargeable battery pack illustrated in FIG. 1.

FIG. 2 is a perspective view of the rechargeable battery pack 110 illustrated in FIG. 1. Referring to FIGS. 1 and 2, the rechargeable battery pack 110 includes a battery cell 100 that performs charging and discharging operations, a molding portion 400, and an adhesive member 500 that attaches the molding portion 400 with the battery cell 100.

Figure 3:
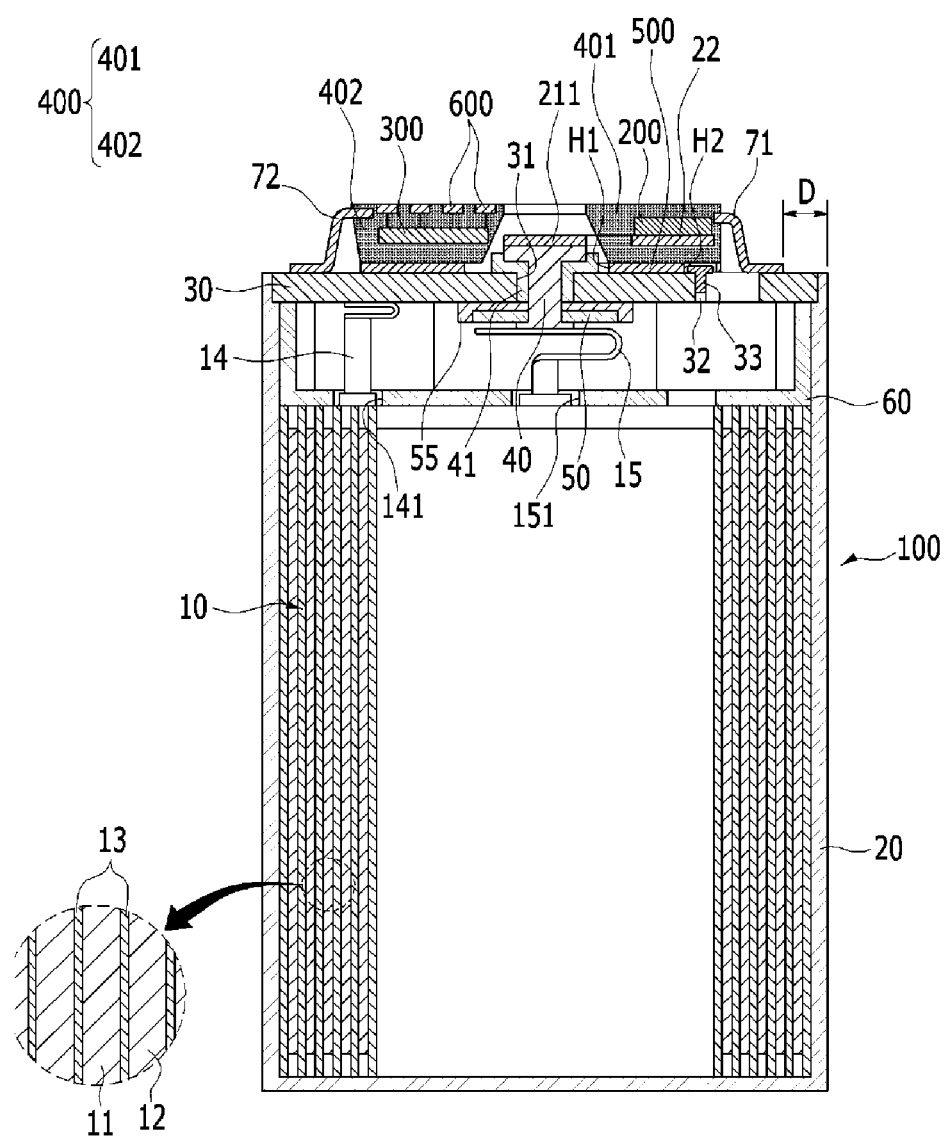
FIG. 3 is a cross-sectional view of FIG. 2 taken along the line III-III.
Figure 4:
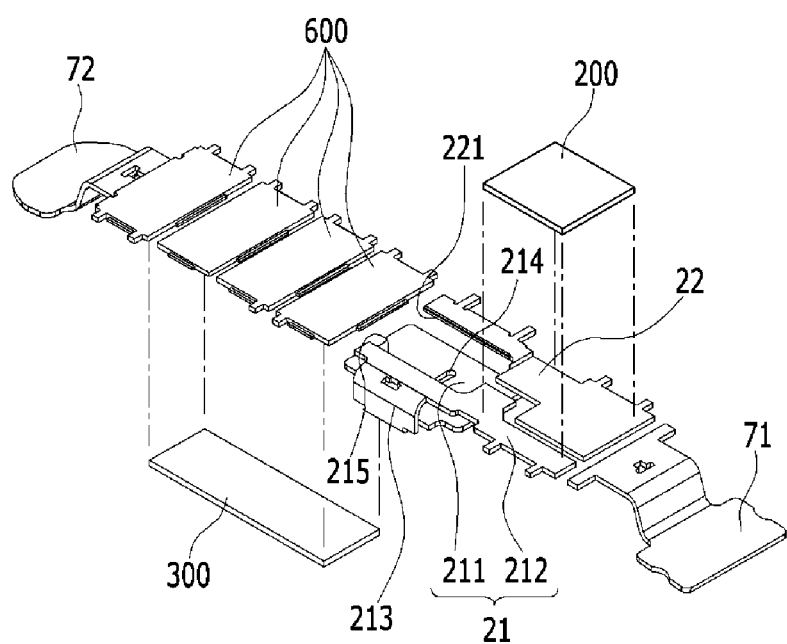
FIG. 4 is an exploded perspective view of a protection management package illustrated in FIG. 1 from which a molding portion is removed.

FIG. 3 is a cross-sectional view of FIG. 2 taken along the line III-III and FIG. 4 is an exploded perspective view of a protection management package illustrated in FIG. 1 from which a molding portion is removed. Referring to FIGS. 3 and 4, the rechargeable battery pack 110 further includes a protection element 200 and a protection management package 300 that are buried in or enclosed by the molding portion 400.

The protection element 200 is electrically coupled to an electrode terminal 40 of the battery cell 100, and the protection management package 300 is electrically coupled to the protection element 200 and a cap plate 30. Outer terminals 600 are exposed to the outside of the molding portion 400 while being electrically coupled to the protection management package 300.

As an example, the battery cell 100 includes an electrode assembly 10 through which a current is charged and discharged, a case 20 housing the electrode assembly 10 along with an electrolyte solution, the cap plate 30 closing and sealing an opening of the case 20 and the electrode terminal 40 provided in a terminal hole 31 of the cap plate 30 to be electrically coupled to the electrode assembly 10.

The battery cell 100 further includes a terminal plate 50 that electrically couples the electrode terminal 40 to the electrode assembly 10, and an insulating case 60 provided between the cap plate 30 and the electrode assembly 10. The electrode assembly 10 has a shape corresponding to an internal space of the case 20 such that it is inserted into the case 20.

A positive electrode 11 and a negative electrode 13 are stacked at opposite sides of a separator 12 while interposing an insulator serving as an insulator therebetween such that they are wound in a jelly roll form, thereby forming the electrode assembly 10. The electrode assembly 10 includes a positive electrode tab 14 that is connected to the positive electrode 11, and a negative electrode tab 15 that is connected to the negative electrode 12.

The positive electrode tab 14 can be connected to a bottom surface of the cap plate 30 by welding, and the case 20 is electrically coupled to the positive electrode 11 of the electrode assembly 10 via the cap plate 30 to serve as a positive electrode terminal.

The negative electrode tab 15 can be welded to be connected to a bottom surface of the terminal plate 50 that is connected to one end of a bottom surface of the electrode terminal 40. The electrode terminal 40 provided in the terminal hole 31 of the cap plate 30 is electrically coupled to the negative electrode 12 of the electrode assembly 10, and serves as a negative terminal.

Though not illustrated, the negative electrode tab may be connected to the cap plate such that the case serves as a negative terminal, and the positive electrode tab may be connected to the electrode terminal such that the electrode terminal serves as a positive electrode terminal.

As an example, the electrode terminal 40 is inserted into the terminal hole 31 of the cap plate 30 to be riveted while interposing an insulating gasket 41 therebetween. In this case, the insulating gasket 41 electrically insulates the terminal hole 31 from the electrode terminal 40, and forms a sealing structure between the terminal hole 31 and the electrode terminal 40.

The terminal plate 50 is electrically coupled to the electrode terminal 40 while interposing an insulating plate 55 therebetween. That is, the insulating plate 55 electrically insulates the cap plate 30 from the terminal plate 50, and further forms a sealing structure between the cap plate 30 and the terminal plate 50.

An opening is provided at an upper part of the case 20 such that the electrode assembly 10 and the insulating case 60 can be inserted therein. In addition, the case 20 houses the electrode assembly 10 as well as the cap plate 30 combined to the opening, and is formed as a conductor to serve as the electrode terminal. For example, the case 20 may be formed of aluminum or an alloy thereof.

The insulating case 60 is provided between the electrode assembly 10 and the terminal plate 50 inside the case 20, and electrically insulates the electrode assembly 10 from the terminal plate 50. That is, the insulating case 60 electrically insulates the positive electrode 11 of the electrode assembly 10 from the terminal plate 50 having negative polarity.

In addition, the insulating case 60 includes tab holes 141 and 151 through which the positive electrode tab 14 and the negative electrode tab 15 penetrate. Accordingly, the positive electrode tab 14 may penetrate the tab hole 141 to be connected to the cap plate 30, while the negative electrode tab 15 may penetrate the tab hole 151 to be connected to the terminal plate 50.

The cap plate 30 further includes an electrolyte injection opening 32. After the case 20 and the cap plate 30 are combined and welded together, the electrolyte injection opening 32 allows the electrolyte solution to be injected into the case 20. After the injection of the electrolyte solution, the electrolyte injection opening 32 is closed and sealed by a sealing cap 33.

On the other hand, the protection element 200 is formed to electrically protect the battery cell 100, and for example, may be formed as a PTC element. That is, the protection element 200 is configured to cut off electrical connectivity between the battery cell 100 and the protection management package 300 if a temperature of the battery cell 100 exceeds a predetermined value when it is charged and discharged.

The protection management package 300 is electrically coupled to the battery cell 100 via the protection element 200. The protection management package 300 configures an electrical circuit to prevent overcharge, over-discharge, overcurrent, and shorting of the battery cell 100, and includes various kinds of components.

The protection element 200 is drawn out as a first connecting tab 21 and a second connecting tab 22. The first connecting tab 21 is connected to the electrode terminal 40, and the second connecting tab 22 is connected to the protection management package 300. The protection management package 300 is electrically coupled to the protection element 200 via the second connecting tab 22, and is electrically and mechanically coupled to the cap plate 30 via an electrode tab 72.

The molding portion 400 buries or encloses the protection element 200 and the protection management package 300 to electrically and mechanically protect the protection element 200 and the protection management package 300. The molding portion 400 can fully enclose the protection element 200 and the protection management package 300. Since the molding portion 400 are integrally formed with the protection element 200 and the protection management package 300, the number of parts for assembling the protection element 200 and the protection management package 300 outside the battery cell 100 can be reduced.

The adhesive member 500 is disposed between the molding portion 400 and the battery cell 100, and attaches the molding portion 400 to an external surface of the cap plate 30 of the battery cell 100. That is, the molding portion 400 and the adhesive member 500 simplify an assembly process of the rechargeable battery pack for assembling the protection element 200 and the protection management package 300 outside the battery cell 100.

Figure 5:
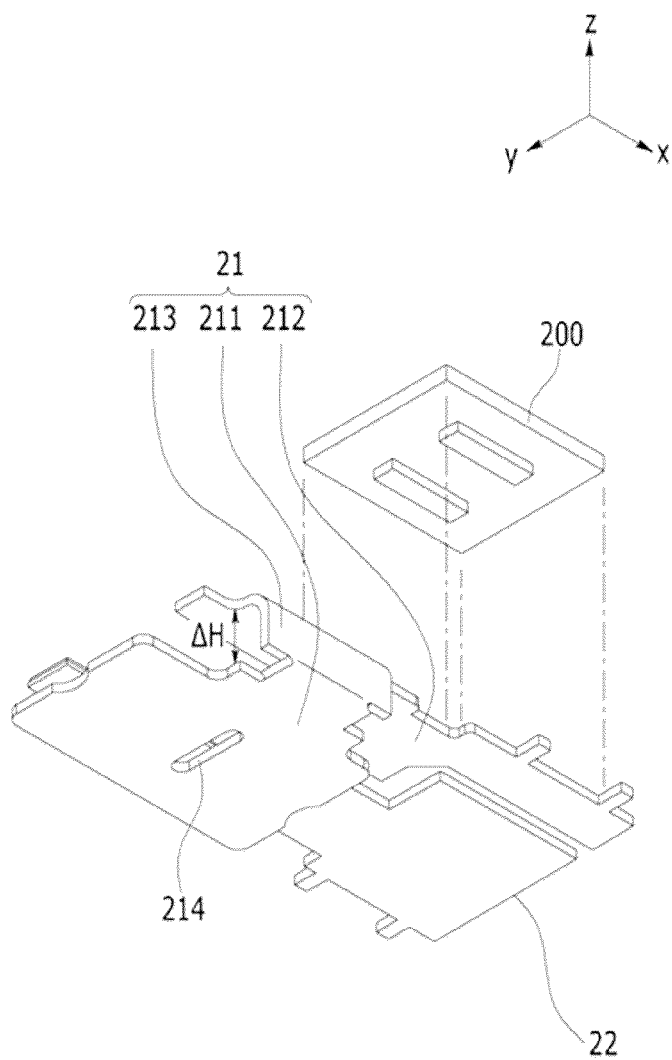
FIG. 5 is an exploded perspective view of the protection element and a connecting member.

FIG. 5 is an exploded perspective view of the protection element and a connecting member. Referring to FIGS. 4 and 5, the first connecting tab 21 has a bending portion 213 that is bent between the electrode terminal 40 and the protection element 200 to set a height difference (ΔH) in a z-axis direction.

That is, the first connecting tab 21 includes a first welded part or a first welded portion 211 connected to a bottom side of the bending portion 213 and a second welded part or a second welded portion 212 connected to a top side of the bending portion 213, while interposing the bending portion 213 therebetween.

At the opposite sides of the bending portion 213, the first welded part 211 is welded to the electrode terminal 40, and the second welded part 212 is welded to the protection element 200 while having the height difference (ΔH) corresponding to the bending portion 213. That is, the electrode terminal 40 is electrically coupled to the protection element 200 via the first welded part 211, the bending portion 213, and the second welded part 212.

The first welded part 211 includes a through-hole 214 toward the electrode terminal 40. The through-hole 214 increases a welding area when the first welded part 211 and the electrode terminal 40 are welded, thereby enhancing adhesion between the first welded part 211 and the electrode terminal 40.

The second welded part 212 is extended from the bending portion 213 in a first direction (a length direction of the cap plate (x-axis direction)), and includes a first recess groove 215 recessed in a width direction of the cap plate 30 (y-axis direction) to allow a top side of the electrode terminal 40 to be opened.

The second connecting tab 22 includes a second recess groove 221 that corresponds to the first recess groove 215 in accordance with the second welded part 212 of the first connecting tab 21.

That is, the first and second connecting tabs 21 and 22 are connected to the protection element 200 while being separated from each other in a second direction crossing the first direction (a width direction of the cap plate (y-axis direction)).

The second connecting tab 22 is formed such that it has substantially the same height as the second welded part 212. Even if the second connecting tab 22 and the second welded part 212 are formed such that they are separated from the first welded part 211 by the height difference (ΔH), which corresponds to the height of the bending portion 213, the first and second recess grooves 215 and 221 allow the top side of the electrode terminal 40 to be opened, thereby allowing the electrode terminal 40 and the first welded part 211 to be welded together.

The molding portion 400 includes a first mold member 401 that buries the protection element 200 and a periphery thereof at one side, and a second mold member 402 that buries the protection management package 300 and a periphery thereof while separated from the first mold member 401 in the length direction of the cap plate 30 (x-axis direction) (refer to FIG. 3). That is, the molding portion 400 is separated into the first and second mold members 401 and 402, and is connected to the first and second connecting tabs 21 and 22 at a point where they are separated.

That is, since the first and second mold members 401 and 402 are separated in the x-axis direction and are connected to the first and second connecting tab 21 and 22, the first and second mold members 401 and 402 may induce bending of the first and second connecting tabs 21 and 22, thereby absorbing the external impact when an impact is applied to the first and second mold members 401 and 402 in the x-axis direction.

In addition, the second mold member 402 further buries the second welded part 212 of the first and second recess grooves 215 and 221 facing each other and the second connecting tab 22. Even in this case, the second mold member 402 opens the top side of the electrode terminal 40, and does not prevent the electrode terminal 40 and the first welded part 211 from being welded together.

As shown in FIG. 1, through-holes H1 and H2, which are aligned with the electrode terminal 40 and the electrolyte injection opening 32, are formed in the adhesive member 500 to have a structure corresponding to the molding portion 400, thereby attaching the molding portion 400 to the cap plate 30. That is, the adhesive member 500 attaches the first and second mold members 401 and 402 to the cap plate 30.

Referring to FIGS. 1 to 4, the rechargeable battery pack further includes a dummy tab 71 that protrudes toward the first mold member 401 to be connected to the cap plate 30. The electrode tab 72 is electrically coupled to the protection management package 300, and protrudes toward the second mold member 402 to be welded to the cap plate 30.

That is, after the molding portion 400 is attached to the cap plate 30 by the adhesive member 500, the electrode tab 72 electrically couples the protection management package 300 to the cap plate 30 while mechanically fixing the first mold member 402. Additionally, the dummy tab 71 may mechanically fix the first mold member 401 to the cap plate 30, thereby stably fixing the molding portion 400.

The electrode tab 72 and the dummy tab 71 can have different shapes at parts where they are welded to the cap plate 30. For example, the dummy tab 71 has a quadrangular shape in accordance with the width of the cap plate 30, and the electrode tab 72 has a round shaped in accordance with an end portion of the cap plate 30 in the length direction thereof.

In addition, the electrode tab 72 and the dummy tab 71 may be disposed such that they are closer to one side of the cap plate 30 from a center thereof. That is, the electrode tab 72 is positioned at an end portion of the cap plate 30 in the length direction thereof, and the dummy tab 71 is positioned at the end portion of the cap plate 30 in the length direction thereof such that it is recessed therefrom by a predetermined distance D.

As such, a direction of the molding portion 400 burying the protection element 200 and the protection management package 300 is limited in the rechargeable battery pack. Accordingly, when the rechargeable battery pack according to the current exemplary embodiment is assembled to electronic devices, misassembly can be prevented.

While the inventive technology has been described in connection with exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery pack including:
   a battery cell including an electrode terminal in a cap plate and configured to perform charging and discharging operations;
   a protection element connected to the electrode terminal via a first connecting tab;
   a protection management package connected to a second connecting tab of the protection element and connected to the cap plate via an electrode tab;
   a molding portion fully enclosing the protection element and the protection management package; and
   an adhesive member disposed between the molding portion and the battery cell to attach them, wherein the adhesive member is not enclosed by the molding portion and wherein the first connecting tab has a bending portion with a bend between the electrode terminal and the protection element so as to set a height difference.

2. The rechargeable battery pack of claim 1, wherein the first connecting tab includes a first welded portion welded to the electrode terminal to be connected to the bending portion, and a second welded portion connected to the bending portion and welded to the protection element while having the height difference with respect to the first welded portion.

3. The rechargeable battery pack of claim 2, wherein the second welded portion extends from the bending portion in a first direction.

4. The rechargeable battery pack of claim 2, wherein the first welded portion includes a through-hole toward the electrode terminal.

5. The rechargeable battery pack of claim 4, wherein the through-hole does not overlap the protection element.

6. The rechargeable battery pack of claim 2, wherein the second welded portion and the second connecting tab include recess grooves that are separated from each other in a second direction crossing the first direction to be connected to the protection element and face each other to open a top side of the electrode terminal.

7. The rechargeable battery pack of claim 6, wherein the molding portion includes:
a first mold member covering the protection element at one side; and
a second mold member separated from the first mold member while interposing the electrode terminal therebetween to enclose the protection management package.

8. The rechargeable battery pack of claim 7, wherein the second mold member further encloses the second welded portion of the recess groove and the second connecting tab that face each other.

9. The rechargeable battery pack of claim 7, further comprising a dummy tab protruding toward the first mold member to be connected to the cap plate, wherein the electrode tab is connected to the protection management package and protrudes toward the second mold member.

10. The rechargeable battery pack of claim 9, wherein the electrode tab and the dummy tab have different shapes at parts where they are welded to the cap plate.

11. The rechargeable battery pack of claim 7, wherein the electrode tab and the dummy tab are disposed to be closer to one side of the cap plate from a center thereof.

12. The rechargeable battery pack of claim 1, wherein a top surface of the protection element is farther from the battery cell than the protection management package.

13. The rechargeable battery pack of claim 1, wherein the protection management package is wider than the protection element.

14. The rechargeable battery pack of claim 1, wherein the molding portion fully encloses the protection element and the protection management package such that the protection element and the protection management package are invisible.

15. The rechargeable battery pack of claim 1, wherein the adhesive member overlaps at least one of the protection element and the protection management package in the height dimension of the rechargeable battery pack.

16. A rechargeable battery pack including:
a battery cell including an electrode terminal;
a protection management package configured to prevent at least one of overcharge, over-discharge, an overcurrent, and a short circuit of the battery cell;
a protection element including first and second connecting tabs and configured to electrically cut off the electrode terminal and the protection management package when a temperature of the battery cell reaches a threshold value;
a molding portion fully enclosing the protection element and the protection management package; and
an adhesive member disposed between the molding portion and the battery cell to attach them, wherein the adhesive member is not enclosed by the molding portion and wherein the first connecting tab has a bending portion bent between the electrode terminal and the protection element so as to set a height difference.

17. The rechargeable battery pack of claim 16, wherein a top surface of the protection element is farther from the battery cell than the protection management package.

18. The rechargeable battery pack of claim 16, wherein the protection management package is wider than the protection element.

19. The rechargeable battery pack of claim 16, wherein the molding portion fully encloses the protection element and the protection management package such that the protection element and the protection management package are not visible.

20. The rechargeable battery pack of claim 16, wherein the adhesive member overlaps at least one of the protection element and the protection management package in the height dimension of the rechargeable battery pack.

21. The rechargeable battery pack of claim 1, wherein the protection element and the protection management package do not overlap each other in the height dimension of the battery cell.

22. The rechargeable battery pack of claim 1, wherein neither of the protection element and the protection management package overlaps the electrode terminal in the height dimension of the battery cell.

* * * * *